United States Patent
Brandys et al.

(10) Patent No.: US 10,223,074 B2
(45) Date of Patent: Mar. 5, 2019

(54) DETERMINING THE IDENTITY OF SOFTWARE IN SOFTWARE CONTAINERS

(71) Applicant: International Business Machines Corporation, Armonk, NY (US)

(72) Inventors: Szymon M. Brandys, Krakow (PL); Piotr P. Godowski, Krakow (PL); Piotr Kania, Krakow (PL); Michal S. Paluch, Krakow (PL); Tomasz A. Stopa, Krakow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/965,922

(22) Filed: Dec. 11, 2015

(65) Prior Publication Data
US 2017/0168778 A1    Jun. 15, 2017

(51) Int. Cl.
| | |
|---|---|
| G06F 9/44 | (2018.01) |
| G06F 8/20 | (2018.01) |
| G06F 8/60 | (2018.01) |
| G06F 9/455 | (2018.01) |
| G06F 9/445 | (2018.01) |

(52) U.S. Cl.
CPC .............. G06F 8/24 (2013.01); G06F 8/60 (2013.01); G06F 9/455 (2013.01); *G06F 9/44505* (2013.01)

(58) Field of Classification Search
CPC ... G06F 8/24; G06F 8/60; G06F 9/455; G06F 9/44505
USPC ........................................................ 717/123
See application file for complete search history.

(56) References Cited

U.S. PATENT DOCUMENTS

| | | | | |
|---|---|---|---|---|
| 7,389,339 | B1* | 6/2008 | Dobberpuhl | G06F 17/302 707/999.01 |
| 7,895,573 | B1* | 2/2011 | Bhargava | G06F 21/554 717/120 |
| 9,118,538 | B1* | 8/2015 | Lekkalapudi | H04L 67/025 |
| 9,141,342 | B2* | 9/2015 | Baumann | G06F 8/30 |
| 2003/0041318 | A1* | 2/2003 | Klarer | G06F 8/4436 717/140 |
| 2003/0135850 | A1* | 7/2003 | Miloushev | G06F 8/36 717/165 |
| 2006/0066905 | A1* | 3/2006 | Takashima | G06F 17/248 358/1.18 |
| 2007/0198609 | A1* | 8/2007 | Black | G06Q 10/087 |

(Continued)

OTHER PUBLICATIONS

"Docker—Build, Ship, and Run Any App, Anywhere", 5 pages, Last printed Sep. 11, 2015 at 11:26 a.m., <https://www.docker.com/>.

(Continued)

*Primary Examiner* — Chameli Das
(74) *Attorney, Agent, or Firm* — Richard A. Wilhelm (57) ABSTRACT

One or more processors scan a first software container template for one or more identities of software present on a first software container associated with the first software container template. One or more processors generate a map of the one or more identities of software present on the first software container. The one or more identities of software present on the first software container are mapped with one or both of: an identifier of the first software container template and an identifier of the first software container associated with the first software container template.

15 Claims, 8 Drawing Sheets

(56) References Cited

U.S. PATENT DOCUMENTS

| | | | | |
|---|---|---|---|---|
| 2011/0055153 | A1* | 3/2011 | Hashimoto | G06F 8/71 707/622 |
| 2011/0113319 | A1* | 5/2011 | Saft | G06F 17/243 715/223 |
| 2012/0311426 | A1* | 12/2012 | Desai | G06F 17/2705 715/227 |
| 2014/0025424 | A1* | 1/2014 | Juillard | 705/7.26 |
| 2014/0122160 | A1 | 5/2014 | Fuller et al. | |
| 2014/0136958 | A1* | 5/2014 | Scattergood | H04L 67/2823 715/236 |
| 2014/0157117 | A1* | 6/2014 | Krappe | G06Q 10/10 715/255 |
| 2015/0365437 | A1* | 12/2015 | Bell, Jr. | H04L 63/20 726/1 |
| 2016/0062714 | A1* | 3/2016 | Yoneda | G06F 3/1243 358/1.18 |
| 2016/0098285 | A1* | 4/2016 | Davis | G06F 9/45545 718/1 |
| 2016/0170743 | A1* | 6/2016 | Shmulevich | G06F 8/30 717/120 |
| 2016/0224354 | A1* | 8/2016 | Garrard | G06Q 10/067 |
| 2016/0224909 | A1* | 8/2016 | Garrard | G06Q 10/067 |
| 2016/0259658 | A1* | 9/2016 | Gocek | G06F 9/45558 |
| 2016/0350105 | A1* | 12/2016 | Kumar | G06F 8/20 |
| 2016/0350173 | A1* | 12/2016 | Ahad | G06F 11/3495 |
| 2017/0193437 | A1* | 7/2017 | Apte | G06F 8/427 |
| 2017/0366606 | A1* | 12/2017 | Ben-Shaul | G06F 3/0619 |

OTHER PUBLICATIONS

"Docker—Remote API", 10 pages, Last printed Sep. 4, 2015 at 15:11 a.m., <https://docs.docker.com/reference/api/docker_remote_api/#docker-events>.

"Docker—Understand the architecture", 12 pages, Last printed Sep. 4, 2015 at 15:11 a.m., <https://www.docker.com/introduction/understanding-docker>.

"LXC", Wikipedia, the free encyclopedia, 3 pages, This page was last modified on Aug. 13, 2015, at 08:25, <https://en.wikipedia.org/wiki/LXC>, printed on Sep. 11, 2015 at 10:50.

* cited by examiner

DETERMINING THE IDENTITY OF SOFTWARE IN SOFTWARE CONTAINERS

BACKGROUND OF THE INVENTION

The present invention relates generally to the field of software identity determination, and more particularly to software identity determination in software containers.

A software container consists of an entire runtime environment: an application, plus all its dependencies, libraries and other binaries, and configuration files needed to execute it, bundled into one package. By "containerizing" the application platform and its dependencies, differences in operating system (OS) distributions and underlying infrastructure are abstracted away.

In general, software containers are considered to be "lightweight" when compared to virtual machines (VMs). Unlike a software container, a VM includes an entire OS as well as the application. For example, a physical server executing three VMs would have a hypervisor and three separate OSs executing on top of it. In contrast, in another example, a server executing three containerized applications executes a single OS kernel that each software container shares with the other software containers. Shared parts of the OS are read only and each software container has its own mount (i.e., a way to access the software container) for writing. That means the software containers are more lightweight in terms of the amount of code or types of software required and use fewer resources than VMs. For example, a software container may be only tens of megabytes in size whereas a VM, with its own entire OS, may be several gigabytes in size. Therefore, a single server can host far more software containers than VMs. Further, VMs may take several minutes to boot up their OSs in order to begin executing the applications they host. In contrast, containerized applications can be started almost instantly.

Because of their lightweight nature and agility, software containers have become increasingly popular. For example, DOCKER is an open-source project that automates the deployment of applications inside software containers by providing an additional layer of abstraction and automation of OS-level virtualization on LINUX. Cgroups (aka control groups) is a LINUX kernel feature often used to limit, monitor, control, and account the resource usage of certain processes (actually process groups). DOCKER uses resource isolation features of the LINUX kernel such as cgroups and kernel namespaces to allow independent LINUX software containers (LXCs) to execute within a single LINUX instance.

DOCKER is an example of the emerging trend for software container-based cloud systems. This is because software containers are rapid to deploy, execute, and migrate in a cloud system. The security of software container-based cloud systems hinges on the fact that software containers, as their name implies, are sealed. LXCs leverage cgroups to isolate the CPU, memory, file/block I/O and network resources. LXCs also use namespaces to isolate the applications from the operating system and separates the process trees, network access, user IDs, and file access. LXCs are considered a technique that falls between chroot and a VM in terms of security. Chroot is an operation that changes the apparent root directory for the current running process and their children. A program that is run in such a modified environment cannot access files and commands outside that environmental directory tree. Changing root is commonly done for performing system maintenance on systems where booting and/or logging in is no longer possible.

SUMMARY

Embodiments of the present invention provide a method, system, and program product to determining the identity of software in software containers. One or more processors scan a first software container template for one or more identities of software present on a first software container associated with the first software container template. One or more processors generate a map of the one or more identities of software present on the first software container, wherein the one or more identities of software present on the first software container are mapped with one or both of: an identifier of the first software container template and an identifier of the first software container associated with the first software container template.

DETAILED DESCRIPTION

The size of cloud systems and the sealed nature of software containers can present many types of challenges for the management of software in software container-based cloud systems. Effective software asset management (SAM) requires that the presence and usage of software be determined in a robust and authoritative manner. The discovery of software is often complex because it requires a search through the installation registries or the contents of the file system of the system-under-scan. There are several drawbacks to such an approach. First, such scans typically require the deployment of an agent that needs to execute expensive file-system scans. File-system scans used to determine software presence and usage often result in workload disruptions in a high-workload, dynamic environment. Further, the agent needs to execute the scan soon after the system-under-scan is provisioned and before it is de-provisioned. In addition, the sealed nature of software containers means that even if it was acceptable to execute expensive filesystem scans, it may not be possible in a software container-based cloud system using current technology.

Software containers are managed by software container engines. In other words, software container engines build and execute software containers. In the process of building a software container, a software container engine creates a template for the software container. When the software container engine finishes building the software container, the software container engine publishes the template as an image into a template repository and the software container is instantiated. It should be noted that once the template has been published, it cannot be further modified. Likewise, once a software container is instantiated, it also cannot be further modified in terms of software content. If new features are desired in one or more applications executing on a software container and the new features require additional software, then a new software container must be created along with a new source template.

In the process of provisioning a software container, a software container engine stores metadata such as software deployment artifacts in the template associated with the software container. This metadata includes information regarding the identity of the software that has been installed on the software container. The identity of software present on any software container can be determined providing a tool exists that can scan or analyze the metadata present on the source template. Analyzing the metadata present on an instantiated template requires less computing resources when compared to conducting a search through the installation registries or the contents of the file system of the software container.

Embodiments of the present invention recognize that software container engines create a template for every software container that the software container engine builds. Embodiments of the present invention recognize that information regarding software that is used to provision a software container is present on the source template for that software container. Embodiments of the present invention provide a method, computer program product, and computer system for searching a software container engine for a template repository. Embodiments of the present invention provide a method, computer program product, and computer system to extract data from one or more template images within the template repository, the data identifying the software content of the one or more corresponding software containers.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

1) On-demand self-service: a cloud consumer can unilaterally provision computing capabilities, such as server time and network storage, as needed automatically without requiring human interaction with the service's provider.

2) Broad network access: capabilities are available over a network and accessed through standard mechanisms that promote use by heterogeneous thin or thick client platforms (e.g., mobile phones, laptops, and PDAs).

3) Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

4) Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

5) Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

1) Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

2) Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

3) Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

1) Private cloud: the cloud infrastructure is operated solely for an organization. It may be managed by the organization or a third party and may exist on-premises or off-premises.

2) Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

3) Public cloud: the cloud infrastructure is made available to the general public or a large industry group and is owned by an organization selling cloud services.

4) Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The present invention will now be described in detail with reference to the Figures.

Figure 1:
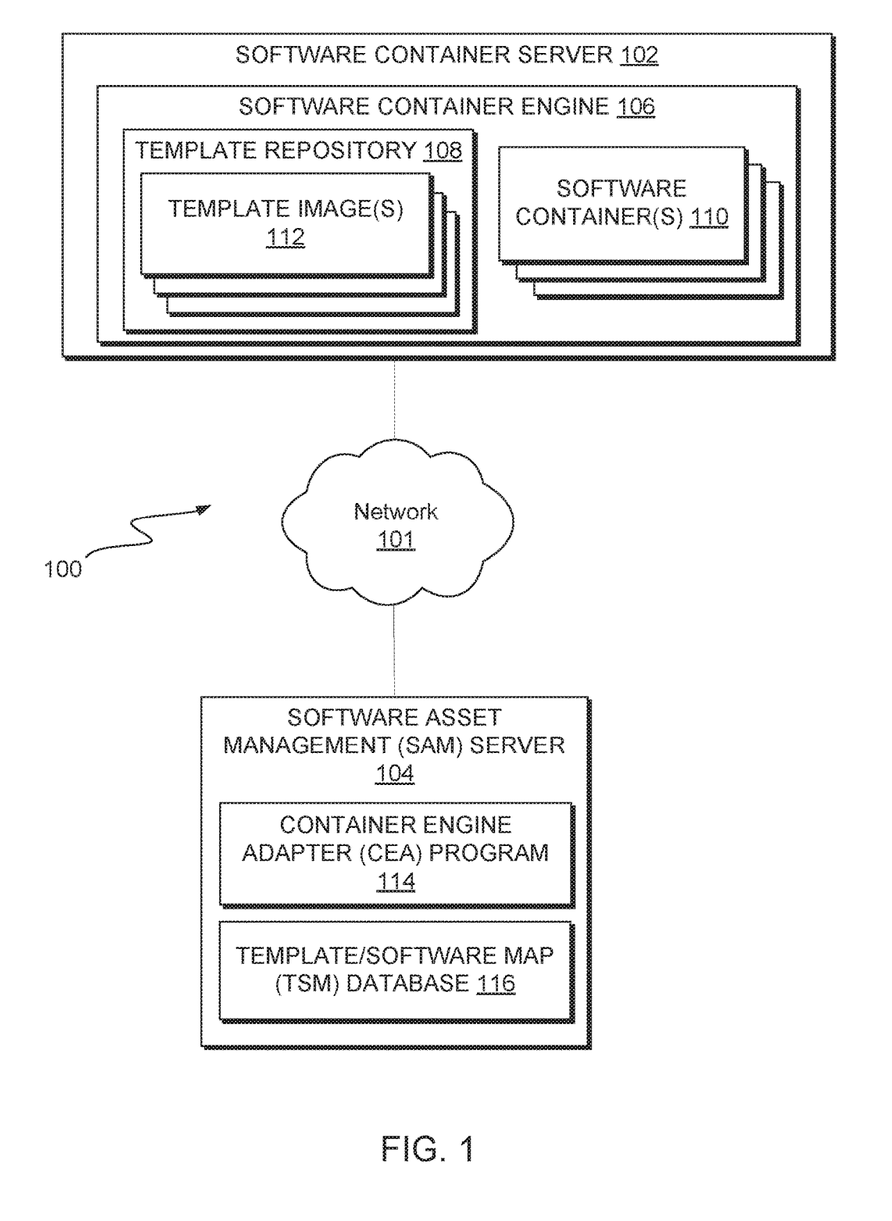
FIG. 1 is a first functional block diagram illustrating a first software discovery environment, in accordance with an exemplary embodiment of the present invention.

FIG. 1 is a first functional block diagram illustrating a first software discovery environment, generally designated 100, in accordance with one embodiment of the present invention. Software discovery environment 100 includes software container server 102 and software asset management (SAM) server 104 connected over network 101. Software container server 102 includes software container engine 106. Software container engine 106 includes template repository 108 and software container(s) 110. Template repository 108 includes template image(s) 112. SAM server 104 includes container engine adaptor (CEA) program 114 and template/software map (TSM) database 116.

In various embodiments of the present invention, software container server 102 and SAM server 104 are computing devices that can one or both be: standalone device(s), server(s), laptop computer(s), tablet computer(s), netbook computer(s), personal computer(s) (PCs), or desktop computer(s). In another embodiment, one or both software container server 102 and SAM server 104 represent a computing system utilizing clustered computers and components to act as a single pool of seamless resources. In general, one or both software container server 102 and SAM server 104 can be any computing device or a combination of devices with access to software container engine 106, template repository 108, software container(s) 110, template image(s) 112, CEA program 114, and TSM database 116 and is capable of executing CEA program 114. Software container server 102 and SAM server 104 may include internal and external hardware components, as depicted and described in further detail with respect to FIG. 8.

In this exemplary embodiment, software container engine 106, template repository 108, software container(s) 110, and template image(s) 112 are stored on software container server 102. CEA program 114 and TSM database 116 are stored on SAM server 104. However, in other embodiments, software container engine 106, template repository 108, software container(s) 110, template image(s) 112, CEA program 114, and TSM database 116 may be stored externally and accessed through a communication network, such as network 101. Network 101 can be, for example, a local area network (LAN), a wide area network (WAN) such as the Internet, or a combination of the two, and may include wired, wireless, fiber optic or any other connection known in the art. In general, network 101 can be any combination of connections and protocols that will support communications between software container server 102, SAM server 104, software container engine 106, template repository 108, software container(s) 110, template image(s) 112, CEA program 114, and TSM database 116, in accordance with a desired embodiment of the present invention.

In exemplary embodiments, software container engine 106 manages the building and execution of software container(s) 110. During the process of building software container(s) 110, software container engine 106 creates a template for each software container. When the software container engine 106 finishes building software container(s) 110, software container engine 106 publishes the templates as template image(s) 112 in a template repository 108 and software container(s) 110 are instantiated. In some embodiments, software container engine 106 is part of a software container-based cloud system.

In exemplary embodiments, template repository 108 is a repository of template image(s) 112 created by software container engine 106. In other words, template repository 108 is a storage location for data that includes information regarding the software content on software container(s) 110. In some embodiments, template repository 108 is part of a software container-based cloud system.

In exemplary embodiments, software container(s) 110 each include an entire runtime environment: one or more applications, plus all their dependencies, libraries and other binaries, and configuration files needed to execute the applications, bundled into one package. In some embodiments, software container(s) 110 are part of a software container-based cloud system.

In exemplary embodiments, template image(s) 112 are images of templates created by software container engine 106 and stored in template repository 108. Each template image in template repository 108 contains data about one software container in software container(s) 110. Included in this data is metadata such as software deployment artifacts, which indicate what software has been installed on that software container. The data present on the templates represented by template image(s) 112 is accessed by instantiating template image(s) 112.

In exemplary embodiments, CEA program 114 is an adapter (i.e. a software adapter) that searches software container server 102 for software container engine 106. CEA program 114 consequently searches software container engine 106 for template repository 108. CEA program 114 retrieves template image(s) 112 and instantiates template image(s) 112. CEA program 114 analyzes instantiated template image(s) 112 to determine which software container in software container(s) 110 is represented by a given instantiated template image in template image(s) 112. CEA program scans the contents of each instantiated template image in instantiated template image(s) 112 for the identity of the software programs executing on the corresponding software container in software container(s) 110. CEA program 114 then creates or updates TSM database 116 with data that includes the mapping of software content on software containers in software container(s) 110 with the corresponding template images in template image(s) 112. CEA program 114 also includes a software asset management function, which includes the function of scanning newly started software containers and reading TSM database 116 in order to create software inventory reports.

In exemplary embodiments, TSM database 116 includes data that identifies the software content executing on one or more software containers within software container(s) 110. The data on TSM database 116 includes template identifiers identifying one or more instantiated template images from template image(s) 112. TSM database 116 correlates the template identifiers with identifiers of the one or more software containers within software container(s) 110 that are described by the one or more instantiated template images from template image(s) 112. TSM database 116 also includes the identity of software built into the one or more software contains within software container(s) 110 because that data is scanned from the one or more instantiated template images from template image(s) 112 that correspond to the one or more software containers.

Figure 2:
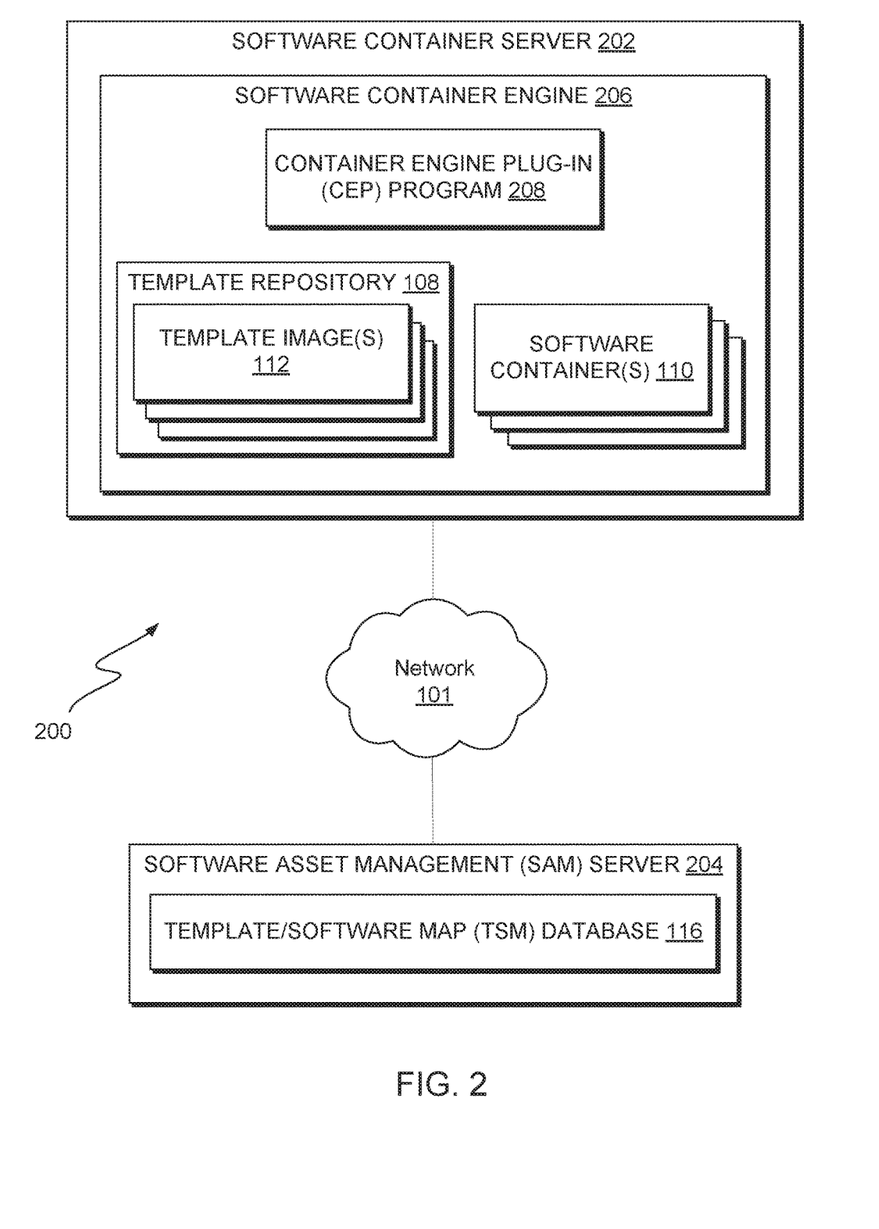
FIG. 2 is a second functional block diagram illustrating a second software discovery environment, in accordance with an exemplary embodiment of the present invention.

FIG. 2 is a second functional block diagram illustrating a second software discovery environment, generally designated 200, in accordance with another embodiment of the present invention. Software discovery environment 200 includes software container server 202 and software asset management (SAM) server 204 connected over network 101. Software container server 202 includes software container engine 206. Software container engine 206 includes template repository 108, software container(s) 110, and container engine plug-in (CEP) program 208. Template repository 108 again includes template image(s) 112. SAM server 104 includes template/software map (TSM) database 116.

In various embodiments of the present invention, software container server 202 and SAM server 204 are computing devices that can one or both be: standalone device(s), server(s), laptop computer(s), tablet computer(s), netbook computer(s), personal computer(s) (PCs), or desktop computer(s). In another embodiment, one or both software container server 202 and SAM server 204 represent a computing system utilizing clustered computers and components to act as a single pool of seamless resources. In general, one or both software container server 202 and SAM server 204 can be any computing device or a combination of devices with access to software container engine 206, CEP program 208, template repository 108, software container(s) 110, template image(s) 112, and TSM database 116 and is capable of executing CEP program 208. Software container server 202 and SAM server 204 may include internal and external hardware components, as depicted and described in further detail with respect to FIG. 8.

In this exemplary embodiment, software container engine 206, CEP program 208, template repository 108, software container(s) 110, and template image(s) 112 are stored on software container server 102 and TSM database 116 is stored on SAM server 104. However, in other embodiments, software container engine 206, CEP program 208, template repository 108, software container(s) 110, template image(s) 112, and TSM database 116 may be stored externally and accessed through a communication network, such as network 101. As described in FIG. 1, network 101 can be, for example, a local area network (LAN), a wide area network (WAN) such as the Internet, or a combination of the two, and may include wired, wireless, fiber optic or any other connection known in the art. In general, network 101 can be any combination of connections and protocols that will support communications between software container server 202, SAM server 204, software container engine 206, CEP program 208, template repository 108, software container(s) 110, template image(s) 112, and TSM database 116, in accordance with a desired embodiment of the present invention.

In exemplary embodiments and as described in the analogous embodiment in FIG. 1, software container engine 206 manages the building and execution of software container(s) 110. During the process of building software container(s) 110, software container engine 206 creates a template for each software container. When the software container engine 206 finishes building software container(s) 110, software container engine 206 publishes the templates as template image(s) 112 in a template repository 108 and software container(s) 110 are instantiated. In some embodiments, software container engine 206 is part of a software container-based cloud system. In this exemplary embodiment, however, software container engine 206 includes CEP program 208, whereas the embodiment described in FIG. 1, software discovery environment 100, does not include CEP program 208.

In exemplary embodiments, CEP program 208 is a plug-in that searches software container engine 206 for template repository 108. CEP program 208 retrieves template image(s) 112 and instantiates template image(s) 112. CEP program 208 analyzes instantiated template image(s) 112 to determine which software container in software container(s) 110 is represented by a given instantiated template image in template image(s) 112. CEP program 208 scans the contents of each instantiated template image in instantiated template image(s) 112 for the identity of the software programs executing on the corresponding software container in software container(s) 110. CEP program 208 then creates or updates TSM database 116 with data that includes the mapping of software content on software containers in software container(s) 110 with the corresponding template images in template image(s) 112. CEP program 208 also includes a software asset management function, which includes the function of scanning newly started software containers and reading TSM database 116 in order to create software inventory reports.

Figure 3:
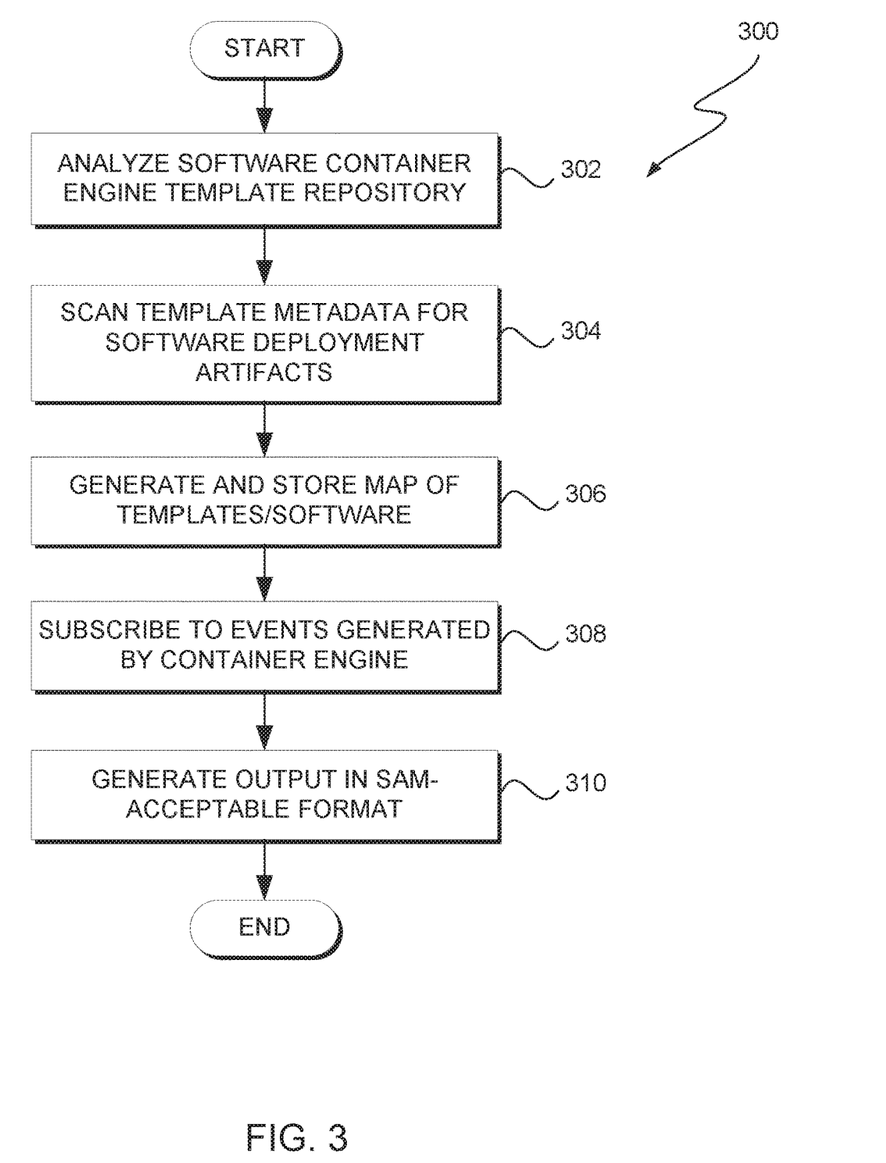
FIG. 3 illustrates a first example of operational processes for discovering, mapping, and reporting software executing on a software container, on a computing device within the environments of FIGS. 1 and 2, in accordance with an exemplary embodiment of the present invention.

FIG. 3 illustrates a first example of operational processes 300 for discovering, mapping, and reporting software executing on software container(s) 110, on SAM server 104 and software container server 202 within the environment of FIGS. 1 and 2, respectively, in accordance with an exemplary embodiment of the present invention.

For reasons of clarity as well as brevity, the steps detailed in operational processes 300 are described as being performed by "CEA program 114/CEP program 208" in order to indicate that CEA program 114 performs the process steps for software discovery environment 100 (FIG. 1) and CEP program 208 performs the process steps for software discovery environment 200 (FIG. 2).

In step 302, CEA program 114/CEP program 208 analyzes template repository 108 for the present template image(s) 112 and retrieves the one or more available template images. The one or more available template image(s) 112 are instantiated by CEA program 114/CEP program 208 in order to analyze the metadata content.

In step 304, CEA program 114/CEP program 208 scans the template metadata within the one or more instantiated template image(s) 112 for software deployment artifacts. In one embodiment, the discovery method used by CEA program 114/CEP program 208 includes a standard filesystem scan of the one or more instantiated template image(s) 112. In another embodiment, the method of software discovery of the one or more instantiated template image(s) 112 includes a software installation registry scan. In yet another embodiment, CEA program 114/CEP program 208 uses a software tags scan as the method of software discovery for the one or more instantiated template image(s) 112. In various embodiments, the CEA program 114/CEP program 208 software discovery method for scanning instantiated template image(s) 112 includes one or more of: a standard filesystem scan, a software installation registry scan, and a software tags scan.

In step 306, CEA program 114/CEP program 208 generates and stores a map showing the connection between one or more templates (i.e., instantiated template images(s) 112), the one or more software container(s) 110 associated with the one or more templates, and the software present on the one or more software container(s) 110 associated with the one or more templates. CEA program 114/CEP program 208 then creates TSM database 116 or updates TSM database 116 if TSM database has already been created. In the embodiment of FIG. 1, CEA program 114 stores TSM database 116 on SAM server 104. In the embodiment of FIG. 2, CEP program 208 stores TSM database 116 on SAM server 204. In other embodiments that are not shown, CEA program 114 stores TSM database 116 in the CEA program 114 memory and CEP program 208 stores TSM database 116 in the CEP program 208 memory.

In various embodiments, TSM database includes fields such as a template image(s) 112 identifier field or a field with identifiers for instantiated template image(s) 112, a field containing identifiers for software container(s) 110, and a field containing software identities. In various embodiments, these fields are arranged in one or more tables so that the template image(s) 112 identifiers (or instantiated template image(s) 112 identifiers) are associated with the corresponding software container(s) 110 identifiers. In these embodiments, the association indicates that an instantiated template contains data describing the software content on the software container associated with that instantiated template. The software identity field contains software identities associated in the same manner with the instantiated template and show what software container in software container(s) 110 is executing that software.

In step 308, CEA program 114 and CEP program 208 subscribe to events generated by software container engine 106 and 206, respectively. In various embodiments, the types of events include one or more of:
1. The creation of a new instance of a software container based on a specific template. This event includes SAM-relevant attributes such as the CPU capacity of the container and the configured RAM or storage of the software container;
2. The reconfiguration of an existing instance of a software container, containing a list of attributes being modified (e.g., CPU capacity and RAM or storage); and
3. The de-provisioning of an existing software container.

In step 310, CEA program 114/CEP program 208 generates output in a SAM-acceptable format. In various embodiments, the output includes accurate software discovery data in real-time for the software executing on software container(s) 110. SAM-acceptable formats for output include, but are not limited to, ISO 19770-2 and ISO 19770-4 XML files. In some embodiments, a specialized output format that is optimized for a specific SAM tool is used.

Figure 4:
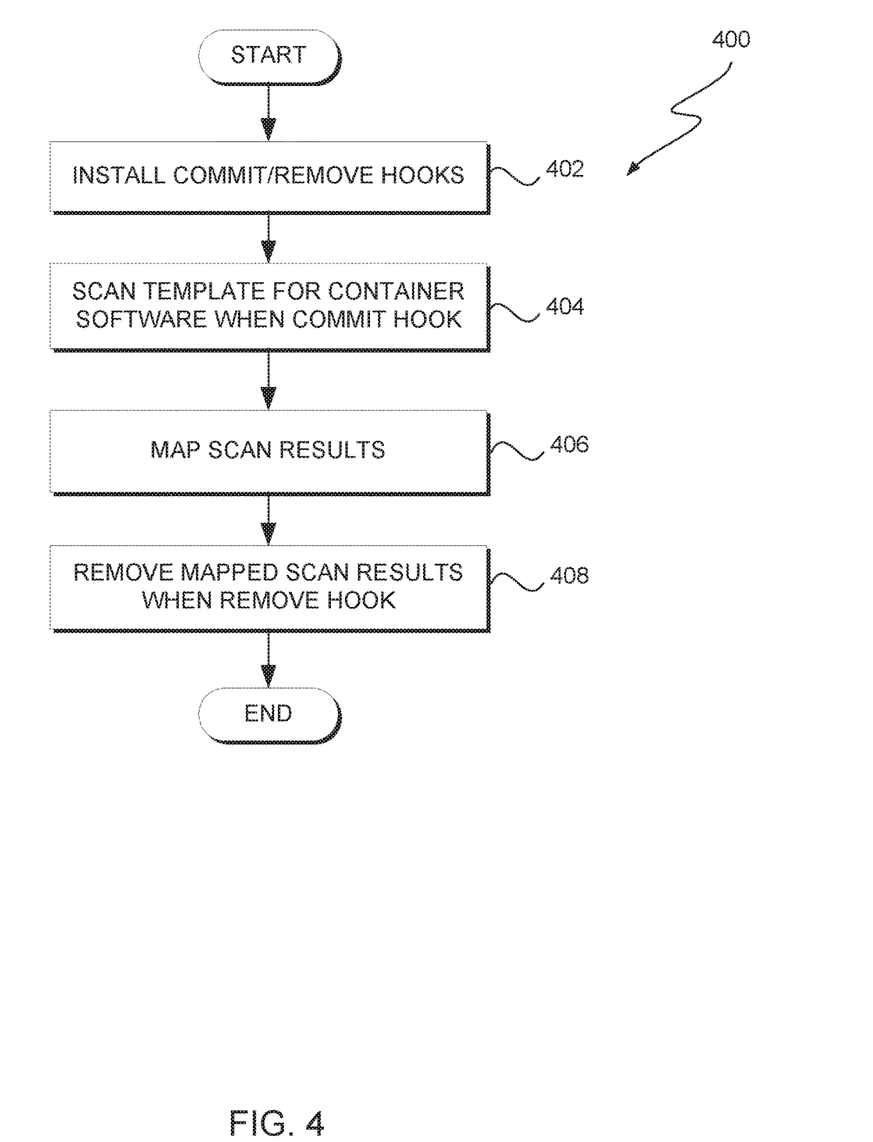
FIG. 4 illustrates a second example of operational processes for discovering and mapping software executing on a software container, on a computing device within the environment of FIGS. 1 and 2, in accordance with an exemplary embodiment of the present invention.

FIG. 4 illustrates a second example of operational processes 400 for discovering and mapping executing on software container(s) 110, on computing devices 104 and 202, within the environments of FIGS. 1 and 2, respectively, in accordance with an exemplary embodiment of the present invention.

For reasons of clarity as well as brevity, the steps detailed in operational processes 400 are described as being performed by "CEA program 114/CEP program 208" in order to indicate that CEA program 114 performs the process steps for software discovery environment 100 (FIG. 1) and CEP program 208 performs the process steps for software discovery environment 200 (FIG. 2).

In step 402, CEA program 114/CEP program 208 prepares the injection of a SAM tool scan during the template image(s) 112 creation process according to a "hook" mechanism. A hook mechanism or "hooking" refers to software that allows alteration or augmentation of an OS, application, or other software component by intercepting function calls, messages, or events. Code that handles such intercepted function calls is referred to as a "hook." In step 402, CEA program 114/CEP program 208 installs two types of hooks. The first type of hook is a "template commit" hook. In various embodiments, the template commit hook is triggered when the last step occurs during the creation of software container(s) 110 by an automated process, such as the creation of software container(s) 110 using DOCKER-FILES, which is similar to "make" files used for automating the processes of software compiling, linking, and packaging. In other embodiments, the template commit hook is triggered when software container templates are manually "pushed" (i.e., published) into template repository 108 and are represented as template image(s) 112. The manual push step occurs subsequent to the creation of new instances of software container(s) 110, which involves the manual addition and removal of applications, the changing of configuration files, etc.

The second type of hook is a "template remove" hook. The template remove hook occurs when one or more template image(s) 112 are removed from template repository 108, i.e., a template, and the software container corresponding to the template, are removed or, in other words, deleted.

In step 404, CEA program 114/CEP program 208 injects the SAM tool scan into a template when the hook for that template registers a template commit hook. The SAM tool scan scans the template for software built into a software container for which the template was created. The SAM tool scan scans the template prior to the moving of that template into template repository 108 to become a template image in template image(s) 112. The resulting scan provides the software inventory for the software container in software container(s) 110 that corresponds to the template that was scanned. The scan also determines a template identifier for the template-under-scan and associates the template identifier with the software container identifier that corresponds to the template/template image.

In step 406, CEA program 114/CEP program 208 maps the scan results by either creating TSM database 116 (if TSM database has not been created yet) or updating TSM database 116 (if TSM database has already been created from previous scans by the injected SAM tool scan on previous templates).

In step 408, CEA program 114/CEP program 208 removes the mapped scan data for a template corresponding to a software container in software container(s) 110 from TSM database 116 when that template, or the template image corresponding to the template, has been removed from template repository 108. In various embodiments, this event indicates the template and the corresponding software container in software container(s) 110 has been deleted, replaced, or de-provisioned.

Figure 5:
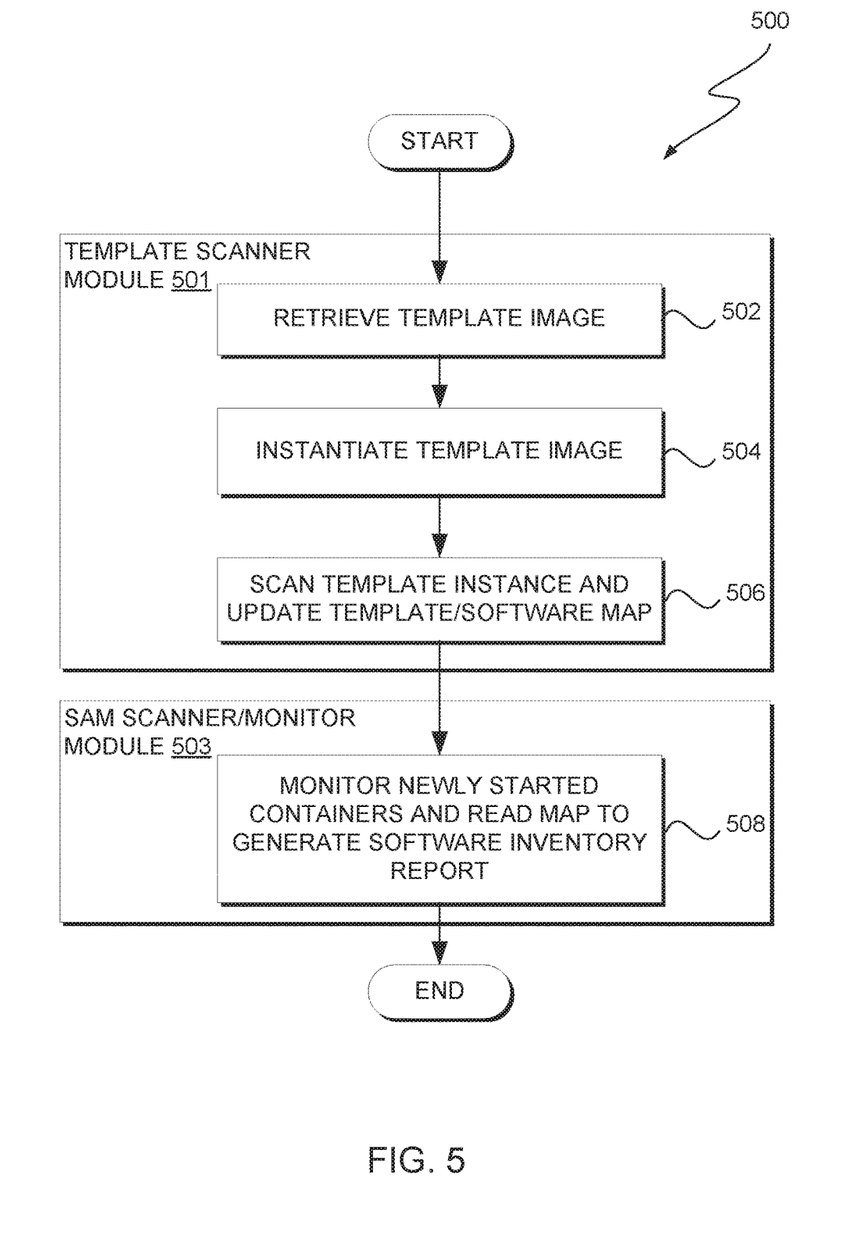
FIG. 5 illustrates the operational processes performed by modules within an adapter and plug-in program on a computing device within the environments of FIGS. 1 and 2, respectively, in accordance with an exemplary embodiment of the present invention.

FIG. 5 illustrates the operational processes 500 performed by modules within CEA program 114 and CEP program 208 on SAM server 104 and software container server 202, respectively, within the environments of FIGS. 1 and 2, respectively, in accordance with an exemplary embodiment of the present invention.

For reasons of clarity as well as brevity, the steps detailed in operational processes 500 are described as being performed by "CEA program 114/CEP program 208" in order to indicate that CEA program 114 performs the process steps for software discovery environment 100 (FIG. 1) and CEP program 208 performs the process steps for software discovery environment 200 (FIG. 2).

In step 502, CEA program 114/CEP program 208 retrieves one or more template images from template image(s) 112 on template repository 108 using template scanner module 501.

In step 504, CEA program 114/CEP program 208 instantiates the one or more template images retrieved from template image(s) 112 using template scanner module 501.

In step 506, CEA program 114/CEP program 208 scans the one or more template instances retrieved from template image(s) 112 and either creates and stores TSM database 116 or updates TSM database 116 using scanner module 501. In the embodiment of FIG. 1, CEA program 114 stores TSM database 116 on SAM server 104. In the embodiment of FIG. 2, CEP program 208 stores TSM database 116 on SAM server 204. In other embodiments that are not shown, CEA program 114 stores TSM database 116 in the CEA program 114 memory and CEP program 208 stores TSM database 116 in the CEP program 208 memory.

In other embodiments, template scanner module 501 injects a SAM tool scan into a template when the hook for that template registers a template commit hook. The SAM tool scan scans the template for software built into a software container for which the template was created. The SAM tool scan scans the template prior to the moving of that template into template repository 108 to become a template image in template image(s) 112. The resulting scan provides the software inventory for the software container in software container(s) 110 that corresponds to the template that was scanned. The scan also determines a template identifier for the template-under-scan and associates the template identifier with the software container identifier that corresponds to the template/template image.

In step 508, CEA program 114/CEP program 208 uses SAM scanner/monitor module 503 to monitor newly started software container(s) 110 and read TSM database 116 in order to generate software inventory reports. In various embodiments, SAM scanner/monitor module 503 subscribes to events generated by software container engine 106 and 206, respectively. The types of events include one or more of:
1. The creation of a new instance of a software container based on a specific template. This event includes SAM-relevant attributes such as the CPU capacity of the container and the configured RAM or storage of the software container;
2. The reconfiguration of an existing instance of a software container, containing a list of attributes being modified (e.g., CPU capacity and RAM or storage); and
3. The de-provisioning of an existing software container.

In various embodiments, SAM scanner/monitor module 503 generates output in a SAM-acceptable format. The output includes accurate software discovery data in real-time for the software executing on software container(s) 110. SAM-acceptable formats for output include, but are not limited to, ISO 19770-2 and ISO 19770-4 XML files. In some embodiments, a specialized output format that is optimized for a specific SAM tool is used.

Figure 6:
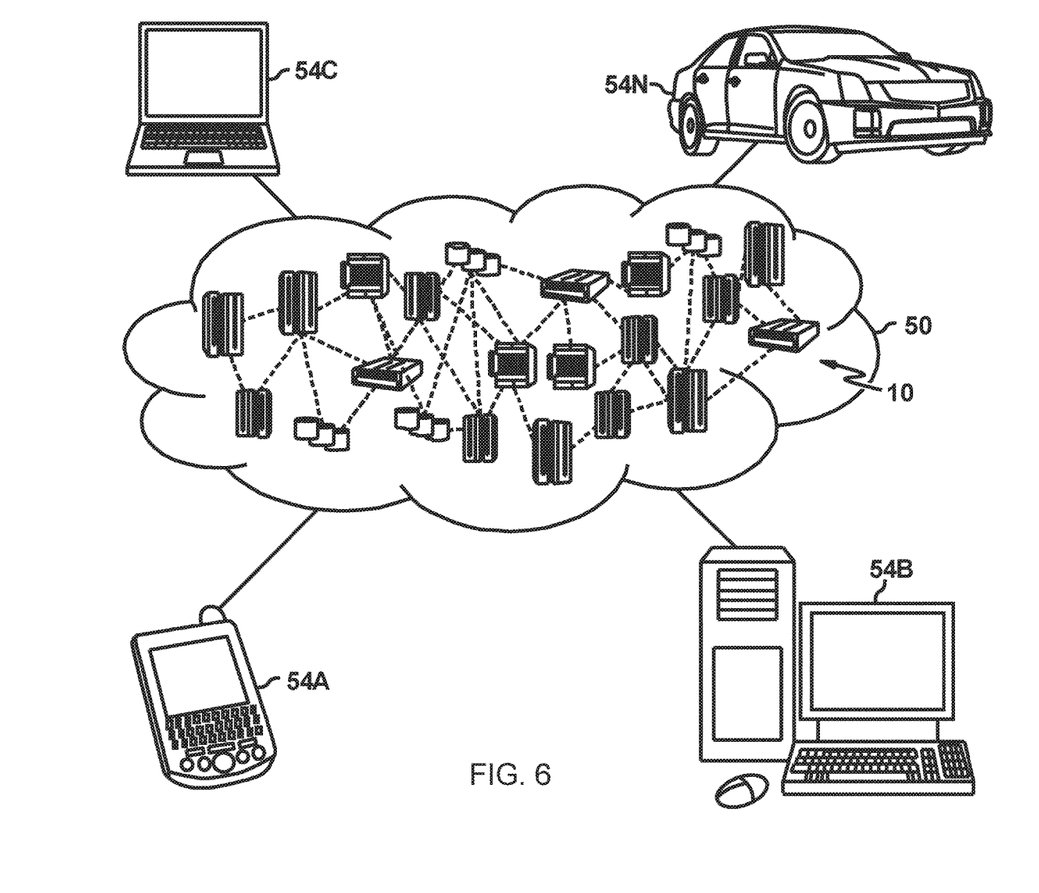
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. Nodes 10 may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 7:
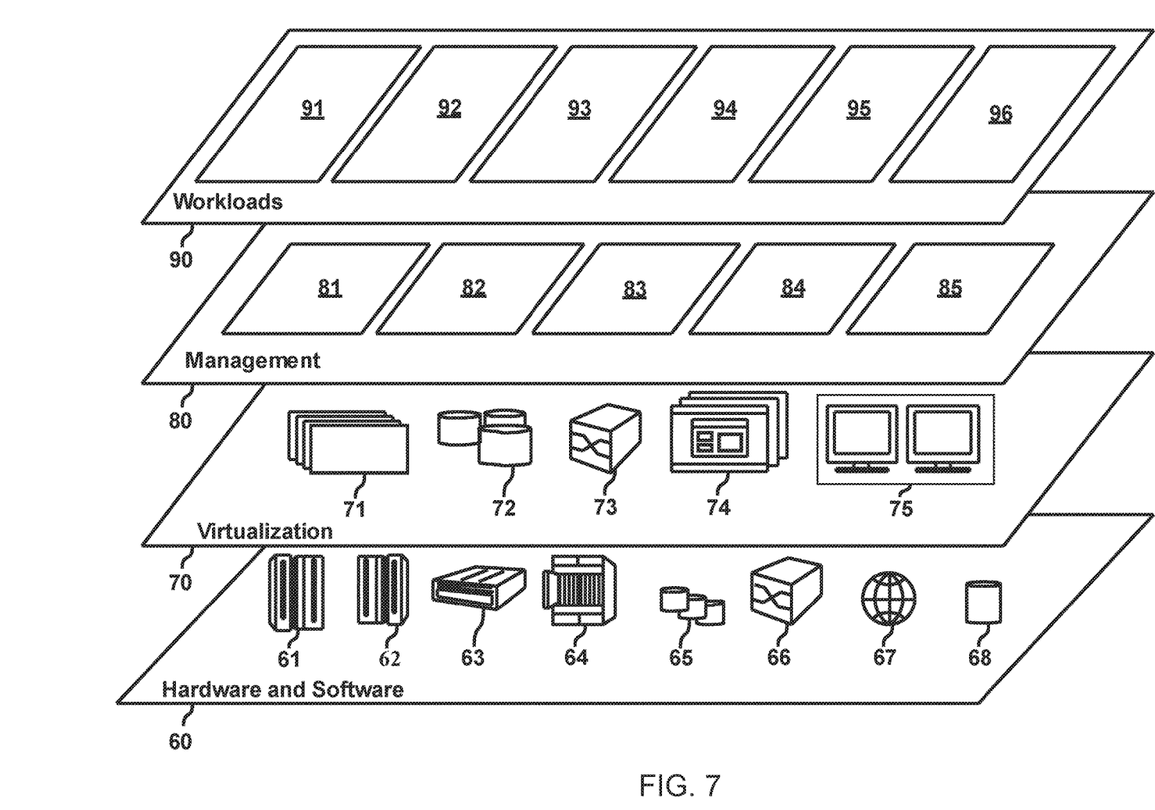
FIG. 7 depicts abstraction model layers according to an embodiment of the present invention.

Referring now to FIG. 7, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Software Asset Management (SAM) 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 8:
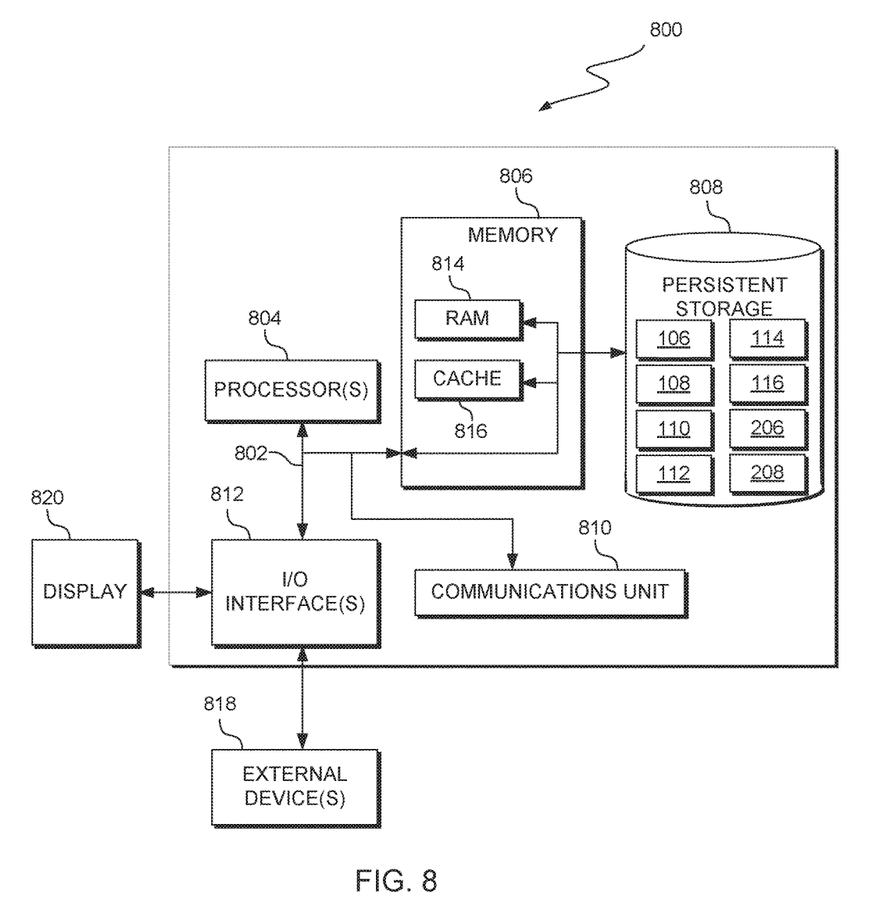
FIG. 8 depicts a block diagram of components of the computing device executing container engine programs, in accordance with exemplary embodiments of the present invention.

FIG. 8 depicts a block diagram, 800, of components of computing devices that have provided illustrative embodiments of the present invention (e.g., software container server 102, SAM server 104, software container server 202, and SAM server 204), in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

The components of the computing devices depicted in FIG. 8 include communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

Software container engine 106, template repository 108, software container(s) 110, template image(s) 112, CEA program 114, TSM database 116, software container engine 206, and CEP program 208 are stored in persistent storage 808 for execution and/or access by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including resources of network 101. In these examples, communications unit 810 includes one or more network interface cards. Communications unit 810 may provide communications through the use of either or both physical and wireless communications links. Software container engine 106, template repository 108, software container(s) 110, template image(s) 112, CEA program 114, TSM database 116, software container engine 206, and CEP program 208 may be downloaded to persistent storage 808 through communications unit 810.

I/O interface(s) 812 allows for input and output of data with other devices that may be connected to computing devices that have provided illustrative embodiments of the present invention (e.g., software container server 102, SAM server 104, software container server 202, and SAM server 204). For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., software container engine 106, template repository 108, software container(s) 110, template image(s) 112, CEA program 114, TSM database 116, software container engine 206, and CEP program 208, can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk," LINUX, DOCKER, and the like may be subject to trademark rights in various jurisdictions throughout the world and are used here only in reference to the products or services properly denominated by the marks to the extent that such trademark rights may exist.

What is claimed is:

1. A method comprising:
creating, by the one or more processors a first software container associated with a first software container template and a publication of the first software container template in a software container template repository;
injecting, by one or more processors, a software asset management tool scan into the first software container template according to a template commit hook, the template commit hook being triggered prior to a last step in the creation of the first software container;
scanning, by one or more processors, the first software container template for one or more identities of software present on the first software container associated with the first software container template, wherein the one or more identities are contained in metadata associated with the first software container template;
generating, by the one or more processors, a map of the one or more identities of software present on the first software container, wherein the one or more identities of software present on the first software container are mapped with one or both of: an identifier of the first software container template and an identifier of the first software container associated with the first software container template; and
generating, by the one or more processors, a software inventory report in a format that to be read by a software asset management program.

2. The method of claim 1 further comprising:
retrieving, by the one or more processors, a first software container template image from a first software container template repository; and
instantiating, by the one or more processors, the first software container template image.

3. The method of claim 1 further comprising:
updating, by the one or more processors, a template/software map database with the map of the one or more identities of software present on the first software container.

4. The method of claim 1 further comprising:
subscribing, by one or more processors, to one or more events generated by a software container engine.

5. The method of claim 4, wherein the one or more events includes one or more of: the creation of a new instance of a second software container, the reconfiguration of an existing instance of a third software container, and the de-provisioning of an existing software container.

6. A computer program product comprising:
one or more computer-readable storage media and program instructions stored on at least one of the one or more computer-readable storage media, the program instructions comprising:
program instructions to create a first software container associated with a first software container template and a publication of the first software container template in a software container template repository;
program instructions to inject a software asset management tool scan into the first software container template according to a template commit hook, the template commit hook being triggered prior to a last step in the creation of the first software container;
program instructions to scan the first software container template for one or more identities of software present on the first software container associated with the first software container template, wherein the one or more identities are contained in metadata associated with the first software container template;
program instructions to generate a map of the one or more identities of software present on the first software container, wherein the one or more identities of software present on the first software container are mapped with one or both of: an identifier of the first software container template and an identifier of the first software container associated with the first software container template; and
program instructions to generate a software inventory report in a format to be read by a software asset management program.

7. The computer program product of claim 6 further comprising:
program instructions to retrieve a first software container template image from a first software container template repository; and
program instructions to instantiate the first software container template image.

8. The computer program product of claim 6 further comprising:
program instructions to update a template/software map database with the map of the one or more identities of software present on the first software container.

9. The computer program product of claim 6 further comprising:
program instructions to subscribe to one or more events generated by a software container engine.

10. The computer program product of claim 9, wherein the one or more events includes one or more of: the creation of a new instance of a second software container, the reconfiguration of an existing instance of a third software container, and the de-provisioning of an existing software container.

11. A computer system comprising:
one or more computer processors;
one or more computer-readable storage media; and
program instructions stored on at least one of the one or more computer-readable storage media for execution by at least one of the one or more processors, the program instructions comprising:
program instructions to create a first software container associated with a first software container template and a publication of the first software container template in a software container template repository;
program instructions to inject a software asset management tool scan into a first software container template according to a template commit hook, the template commit hook being triggered prior to a last step in the creation of the first software container;
program instructions to scan the first software container template for one or more identities of software present on the first software container associated with the first software container template, wherein the one or more identities are contained in metadata associated with the first software container template;
program instructions to generate a map of the one or more identities of software present on the first software container, wherein the one or more identities of software present on the first software container are mapped with one or both of: an identifier of the first software container template and an identifier of the first software container associated with the first software container template; and
program instructions to generate a software inventory report in a format to be read by a software asset management program.

12. The computer system of claim 11 further comprising:
program instructions to retrieve a first software container template image from a first software container template repository; and
program instructions to instantiate the first software container template image.

13. The computer system of claim 11 further comprising:
program instructions to update a template/software map database with the map of the one or more identities of software present on the first software container.

14. The computer system of claim 11 further comprising:
program instructions to subscribe to one or more events generated by a software container engine.

15. The computer system of claim 14, wherein the one or more events includes one or more of: the creation of a new instance of a second software container, the reconfiguration of an existing instance of a third software container, and the de-provisioning of an existing software container.

* * * * *